United States Patent
Nakano

(10) Patent No.: US 9,079,710 B2
(45) Date of Patent: Jul. 14, 2015

(54) PACKAGING DEVICE FOR WASTE STORAGE DEVICE AND WASTE STORAGE DEVICE

(75) Inventor: Yoichi Nakano, Tokyo (JP)

(73) Assignee: Kyoritsu Seiyaku Corproration, Tokyo (JP)

( * ) Notice: Subject to any disclaimer, the term of this patent is extended or adjusted under 35 U.S.C. 154(b) by 798 days.

(21) Appl. No.: 13/380,062

(22) PCT Filed: Jun. 22, 2010

(86) PCT No.: PCT/JP2010/060506
§ 371 (c)(1),
(2), (4) Date: Mar. 5, 2012

(87) PCT Pub. No.: WO2010/150763
PCT Pub. Date: Dec. 29, 2010

(65) Prior Publication Data
US 2012/0151882 A1    Jun. 21, 2012

(30) Foreign Application Priority Data

Jun. 22, 2009   (JP) ................................ 2009-147515

(51) Int. Cl.
*B65B 9/02* (2006.01)
*B65F 1/06* (2006.01)
(Continued)

(52) U.S. Cl.
CPC . *B65F 1/062* (2013.01); *B65B 9/02* (2013.01); *B65F 1/1607* (2013.01); *B29C 65/008* (2013.01);
(Continued)

(58) Field of Classification Search
CPC .......... B65B 9/02; B65B 51/16; B65B 51/28; B65F 1/00; B65F 1/06; B65F 1/062; B65F 2210/167; B65F 2240/132; B65F 2240/164

USPC .............. 53/553, 554, 555, 374.4, 375.4; 220/908, 908.1

See application file for complete search history.

(56) References Cited

U.S. PATENT DOCUMENTS

| 2,616,232 | A | * | 11/1952 | Meyer | 53/450 |
| 3,596,428 | A | * | 8/1971 | Young et al. | 53/451 |
| 3,641,737 | A | * | 2/1972 | Tamagni | 53/554 |
| 4,215,524 | A | * | 8/1980 | Saylor | 53/554 |
| 5,460,844 | A | * | 10/1995 | Gaylor | 426/394 |

(Continued)

FOREIGN PATENT DOCUMENTS

| JP | 61-217309 | 9/1986 |
| JP | 2006 321516 | 11/2006 |
| WO | 2005 037684 | 4/2005 |

OTHER PUBLICATIONS

International Search Report issued on Aug. 10, 2010 in PCT/JP10/060506 filed on Jun. 22, 2010.

*Primary Examiner* — Thanh Truong
*Assistant Examiner* — Dianne Mitchell
(74) *Attorney, Agent, or Firm* — Oblon, McClelland, Maier & Neustadt, L.L.P.

(57) ABSTRACT

A waste storage device includes a waste storage part for storing a waste item and a packaging device arranged in an upper part of the waste storage part. The packaging device includes two film feed rollers, two waste sealing rollers which pull out films and are arranged in parallel that the peripheral surfaces thereof are in contact via the pulled out respective films in a normal state and at least one of which has the peripheral surface that is elastically deformed along the shape of the waste item, and a driving part which rotates the rollers. Two friction rollers which are driven and rotated to sandwich the films sealing the waste item having passed between the waste sealing rollers and pull them downward are provided below the waste sealing rollers. The device prevents a waste item sealed with resin films from being caught in rollers such as waste sealing rollers.

11 Claims, 10 Drawing Sheets

(51) Int. Cl.
*B65F 1/14* (2006.01)
*B29C 65/00* (2006.01)

(52) U.S. Cl.
CPC ............. *B29C 66/1122* (2013.01); *B29C 66/43* (2013.01); *B29C 66/81435* (2013.01); *B29C 66/81457* (2013.01); *B29C 66/83413* (2013.01); *B29C 66/83513* (2013.01); *B29C 66/849* (2013.01); *B65F 2210/167* (2013.01)

(56) References Cited

U.S. PATENT DOCUMENTS

| | | | | |
|---|---|---|---|---|
| 6,065,272 | A * | 5/2000 | Lecomte | 53/576 |
| 6,195,966 | B1 * | 3/2001 | Shomron et al. | 53/451 |
| 6,994,247 | B2 * | 2/2006 | Richards | 232/43.1 |
| 7,069,705 | B2 * | 7/2006 | Redmond | 53/133.3 |
| 7,389,630 | B2 * | 6/2008 | Nakano | 53/553 |

* cited by examiner

PACKAGING DEVICE FOR WASTE STORAGE DEVICE AND WASTE STORAGE DEVICE

TECHNICAL FIELD

This invention relates to a packaging device for waste storage device for sealing and storing waste items such as used disposable diapers, sanitary napkins or other trashes and a waste storage device including the packaging device.

BACKGROUND ART

Patent literature 1 discloses a device for storing smell-producing waste items that are likely to produce smell such as used disposable diapers and sanitary napkins by sealing them with films.

Specifically, a packaging device is provided in an upper part of a trash storage part for storing waste items to be treated. This packaging device includes two film feed rollers rotatably arranged in parallel and at a predetermined interval from each other and adapted to supply two films, and two film pull-out rollers (waste sealing rollers) arranged in parallel such that the peripheral surfaces thereof are in contact via the respective films pulled out from the respective film feed rollers. Further, out of the two waste sealing rollers, at least one has the peripheral surface that is elastically deformed along the shape of a waste item to be treated, and the respective waste sealing rollers are rotated by a driving part.

At least one of the films fed from the two film feed rollers has an adhesive layer formed on a surface facing the other film. When a waste item is thrown in between the two film feed rollers and the two waste sealing rollers are rotated by the driving part, at least one of the waste sealing rollers is elastically deformed by the waste item. Further, when the waste item passes between the respective waste sealing rollers, the films are brought into contact with each other around the waste item. A plurality of waste items are successively stored into the trash storage part while being individually sealed.

CITATION LIST

Patent Literature

Patent literature 1: Publication of Patent No. 3923068

SUMMARY OF INVENTION

Technical Problems

In the device disclosed in patent literature 1, for example, when one film is an adhesive film having the adhesive layer formed on the surface facing the other film and the other film is formed with no adhesive layer, the one adhesive film is difficult to stretch, but the other film is easy to stretch. The respective films are stretched by being pulled by the rotation of the respective waste sealing rollers, but try to contract by as much as they were stretched after passing between the waste sealing rollers. At this time, due to a difference in stretch ratio between the both films, the waste item tends to be warped toward one side in a sealed state after passing the waste sealing rollers. If waste items are successively sealed in this state, the waste item may be caught in either one of the waste sealing rollers in the state sealed with the films.

Further, as the volume of the waste items sealed with the films and fed into the trash storage part increases, the waste items have difficulty in moving downward and become more easily bent in a lateral direction after the passage between the waste sealing rollers. That is, as the treatment volume of the waste items increases, a phenomenon that the waste item is caught in the waste sealing roller may be increased.

The present invention was developed in view of the above problems, and aims to provide a packaging device for waste storage device capable of preventing a waste item sealed with films from being caught in a roller such as a waste sealing roller when a waste item such as a used disposable diaper or a sanitary napkin is sealed with the films and fed into a trash storage part, and a waste storage device including such a packaging device.

Solution to Problem

In order to attain the object stated above, the present invention is directed to a packaging device for waste storage device arranged in an upper part of a waste storage part for storing a waste item and adapted to seal the waste item and store it in the waste storage part, comprising a frame member which is formed with an inlet for allowing the waste item to be thrown in; two film feed rollers which are arranged at a predetermined interval from each other in the frame member; two waste sealing rollers which are provided in the frame member and arranged such that the peripheral surfaces thereof are in contact via films pulled out from the respective film feed rollers and at least one of which has the peripheral surface that is elastically deformed along the shape of the waste item; a driving part which rotates the respective waste sealing rollers; and two friction rollers which are driven and rotated to pull the waste item having passed between the two waste sealing rollers downward in a state where the waste item is sealed between two films, and located below the two waste sealing rollers.

Preferably, the two friction rollers are rotatably provided in housings arranged below the two waste sealing rollers and at least parts of the respective friction rollers in contact with the films are exposed to the outside through opening parts formed in the respective housings.

Preferably, the width of the respective opening parts of the respective housings is narrower than that of the films, and clearances between the peripheral surfaces of the respective friction rollers and the opening parts of the respective housings are less than the thickness of the waste item. Further preferably, the clearances between the peripheral surfaces of the respective friction rollers and the opening parts of the respective housings are equal to or less than 5 mm.

Preferably, the respective housings supporting the respective friction rollers are biased in directions toward each other by an elastic member in a normal state and are rotated outwardly together with the friction rollers when a load acts in a direction to separate the friction rollers. The respective housings preferably include a rotation control member for controlling rotation when a load acts in the direction to separate the friction rollers.

Preferably, the respective housings are provided rotatably about upper parts thereof; the rotation control member includes one arm provided on one housing and another arm provided on the other housing and a pin formed on the one arm is engaged with a long hole formed in the other arm; and the respective arms are rotated together with the respective housings, whereby the pin of the one arm presses the inner wall of the long hole of the other arm and the respective housings are respectively rotated equally outwardly with a central point therebetween as a reference point.

Preferably, the respective friction rollers are so shaped as to have flat surfaces on at least parts of the outer peripheral surfaces thereof and so provided that the flat surface of one friction roller and that of the other friction roller are right opposite each other at the time of rotation.

The outer peripheral length of the friction rollers is preferably longer than that of the waste sealing rollers. The respective friction rollers are preferably made of a hard material. Friction members are preferably provided on the peripheral surfaces of the respective friction rollers. The rotation speed of the two friction rollers is preferably equal to or faster than that of the two waste sealing rollers.

Further, the present invention is directed to a waste storage device, characterized in that the packaging device for waste storage device is arranged in an upper part of a waste storage part for storing a waste item.

Effects of Invention

According to the present invention, particularly smell-producing waste items which produce smell such as used disposable diapers, sanitary napkins or other trashes can be treated by being sealed with films. At this time, since the two friction rollers are provided below the two waste sealing rollers, the films after packaging a waste item are sandwiched and pulled downward by the two friction rollers, whereby the waste item sealed with the films can be prevented from being caught in the waste sealing rollers.

A measure is taken such that surface frictional forces of the friction rollers are higher than those of the waste sealing rollers. Thus, as compared with a conventional construction for pulling a waste item into the waste storage part only by waste sealing rollers, a pull-in force is increased and a new waste item sealed with the films is pressed against waste items already stored in the waste storage part with a stronger force than before, wherefore storage efficiency of waste items can be increased.

Further, even if the sealed waste items substantially fill up the interior of the waste storage part, the two friction rollers rotate to pull the waste item more downward and are supported in the housings except at the partial exposed parts. Thus, even if the waste item fed by the friction rollers is biased in a lateral direction, it is not caught in the waste sealing roller.

Further, by setting the width of the opening parts of the housings where the two friction rollers are exposed narrower than that of the films and setting the clearances between the peripheral surfaces of the respective friction rollers and the opening parts of the respective housings less than the thickness of the waste item, preferably less than 5 mm, the waste item cannot enter through tiny clearances between the housings and the friction rollers and entanglement in the friction rollers can be more reliably prevented.

EMBODIMENTS OF INVENTION

Figure 1:
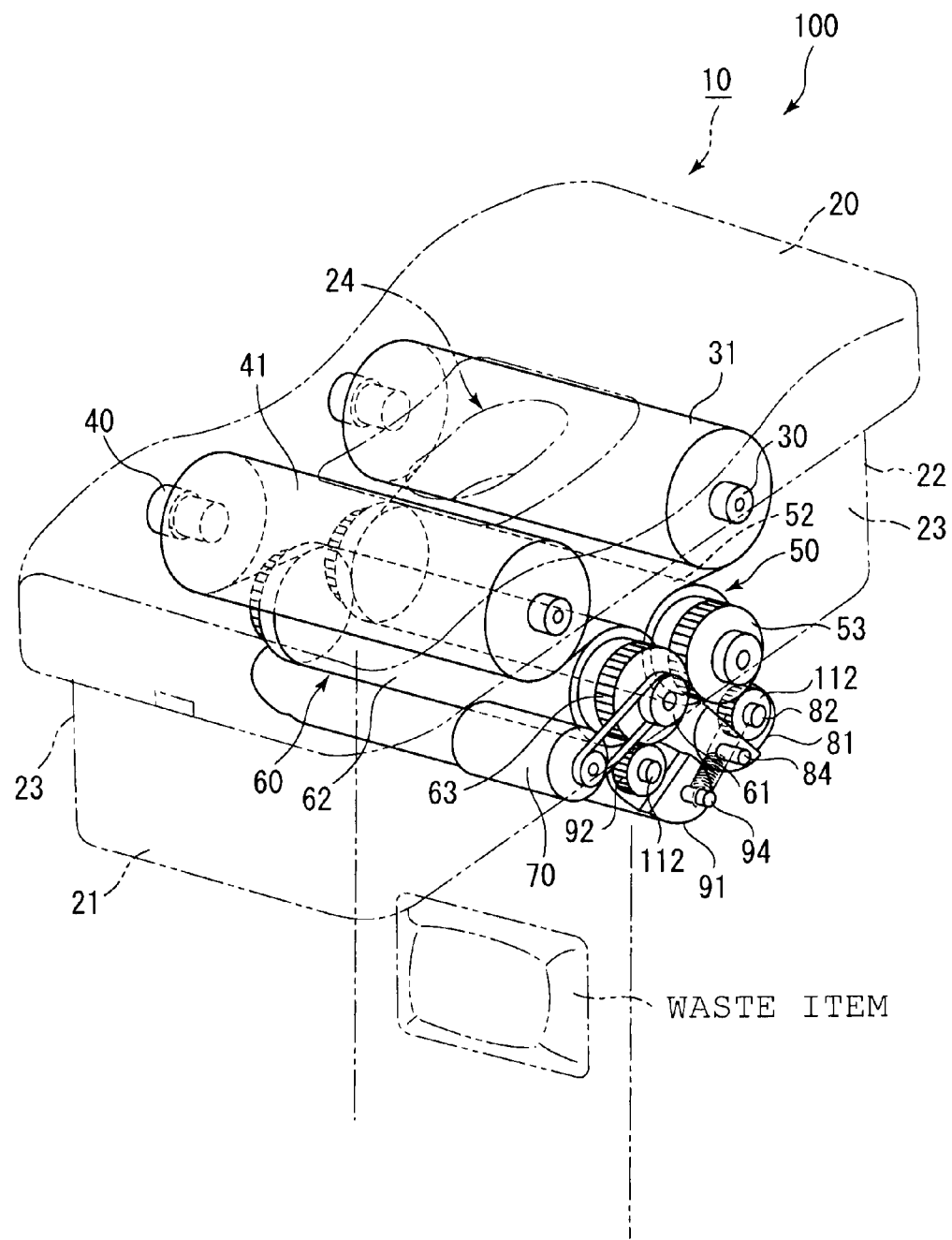
FIG. 1 is a perspective view showing the structure of a packaging device for waste storage device according to one embodiment of the present invention.

Hereinafter, the present invention is described in more detail based on embodiments thereof shown in the drawings.

Figure 2:
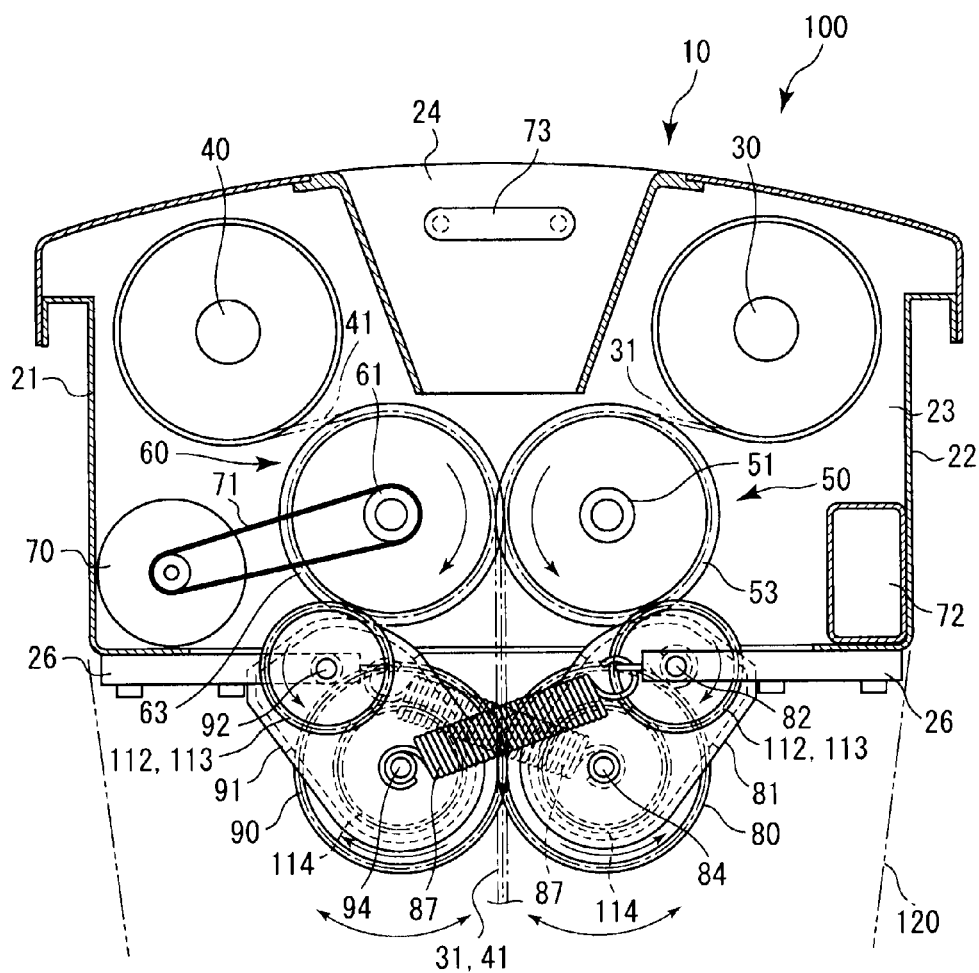
FIG. 2 is a side view showing the internal structure of the packaging device for waste storage device according to the one embodiment.
Figure 3:
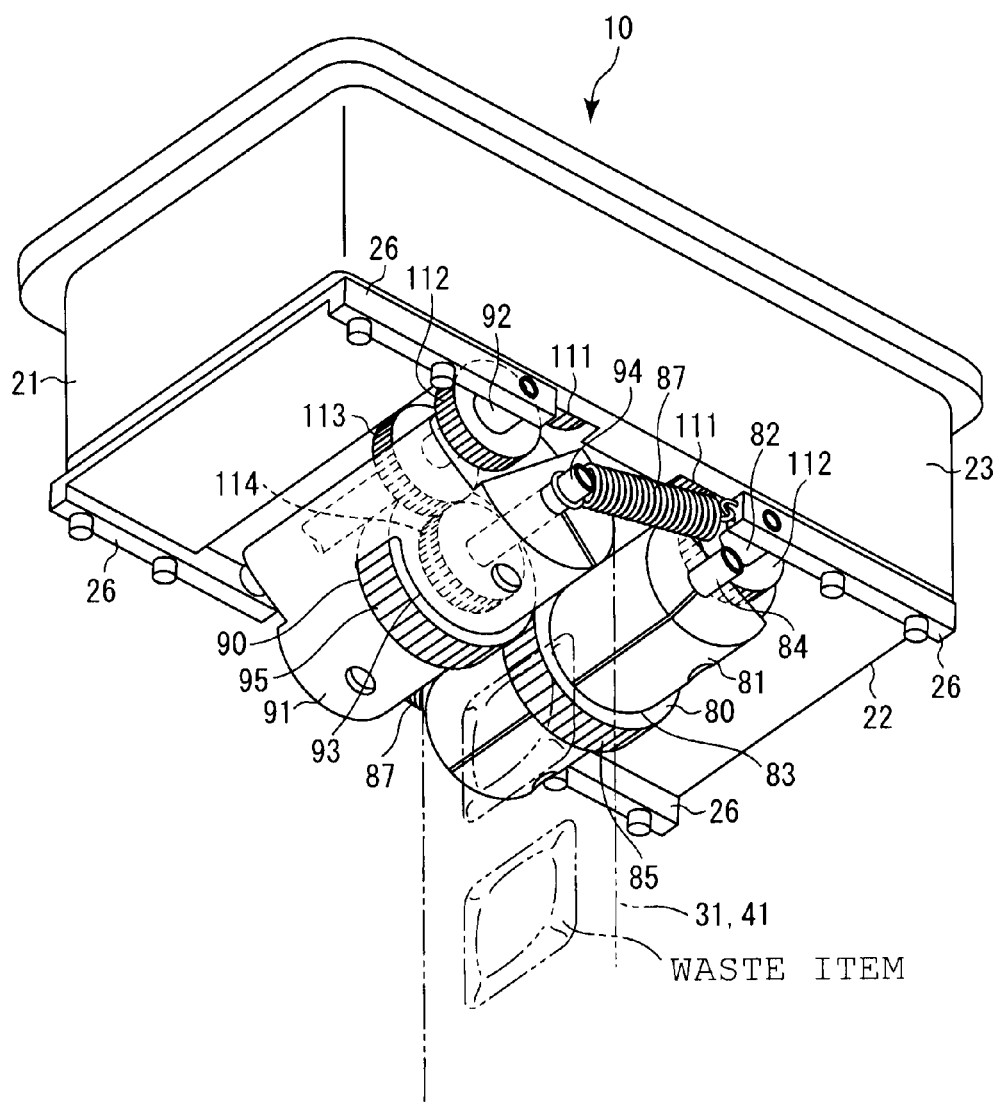
FIG. 3 is a perspective view showing the structure of the packaging device for waste storage device according to the one embodiment when obliquely viewed from below.

FIG. 1 is a perspective view showing the structure of a packaging device 10 for waste storage device used in a waste storage device 100 according to one embodiment of the present invention, and FIG. 2 is a side view showing the internal structure of the packaging device 10 for waste storage device. FIG. 3 is a perspective view of the packaging device 10 for waste storage device when obliquely viewed from below. As shown in these figures, the packaging device 10 for waste storage device of this embodiment includes a frame member 20, film feed rollers 30, 40, waste sealing rollers 50, 60, a motor (driving part) 70 and friction rollers 80, 90.

The frame member 20 has to rotatably support the film feed rollers 30, 40 and the waste sealing rollers 50, 60 and the structure and shape thereof are not limited.

In this embodiment, as shown in FIG. 1, the frame member 20 including a front panel part 21, a rear panel part 22 and two side panel parts 23, 23 facing each other is used, and the respective rollers 30 to 60 are rotatably arranged to extend between the facing side panel parts 23, 23.

Figure 6:
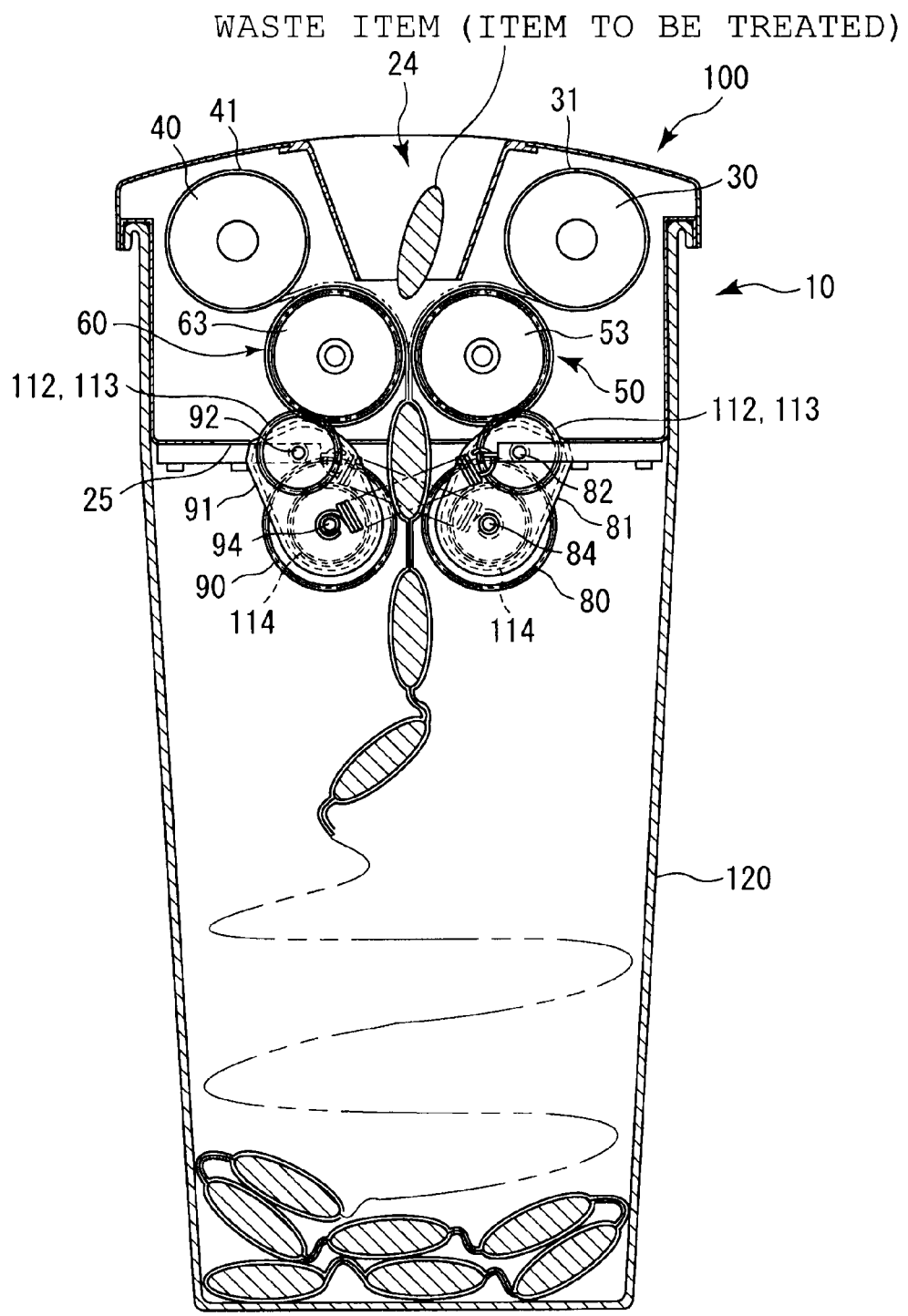
FIG. 6 is a diagram showing a function of the packaging device for waste storage device according to the one embodiment.

Further, as shown in FIG. 6, the packaging device 10 for waste storage device of this embodiment is detachably mounted in an upper part of a bottomed waste storage part 120 with an open upper surface. An inlet 24 is formed at an arbitrary position, e.g. in the upper surface of the frame member 20. When being thrown in through the inlet 24, a waste item as an item to be treated is stored into the waste storage part 120 via a lower end opening part 25 provided at the bottom of the frame member 20. Note that the inlet 24 has to be so provided that the waste item can be fed to between the film feed rollers 30, 40, and the formation position and structure thereof are not limited.

The film feed rollers 30, 40 extend between the side panel parts 23, 23 of the frame member 20 and are arranged to face in parallel and at a predetermined interval from each other as described above, and are so provided that waste items as items to be treated can pass between the facing film feed rollers 30, 40. The film feed rollers 30, 40 are for supplying films for sealing the waste item thrown in therebetween, and films 31, 41 having predetermined length and width are wound thereon. The type and material of the films 31, 41 are not limited, but need to have a property that facing film surfaces are brought into close contact with each other when being joined since they are for sandwiching and sealing the waste item.

For example, plastic films may be used and brought into close contact with each other by electrostatic action, or a film having adhesive layers formed at least on lateral edges (adhesive film) may be used as at least one of the films 31, 41, preferably as both films. By using such an adhesive film, adhesion between the films 31, 41 can be increased.

In this embodiment, adhesive films are used as both one film 31 and the other film 41. Note that the adhesive layers can seal the waste item between the films 31, 41 by being provided at least on lateral edges of either one of the films 31, 41 as described above, but may be provided in lines along a width direction at predetermined intervals in a pull-out direction (moving direction) of the films 31, 41. This enables the films 31, 41 to be brought into close contact with each other also at positions before and behind of the waste item in the pull-out direction (moving direction) of the films 31, 41, wherefore each waste item can be reliably sealed.

However, in being able to be more reliably brought into close contact with the surface of the waste item, it is preferable to form an adhesive layer over a range having a size (area) exceeding the planar size (area) of the waste item at least on one facing surface of the films 31, 41, preferably on both facing surfaces. Since the sizes of disposable diapers and sanitary napkins are determined to a certain degree, it is possible to set sizes (areas) exceeding the planar sizes (areas) thereof. The adhesive layer is preferably formed entirely on the facing surface of at least one of the films 31, 41, more preferably formed entirely on the both facing surfaces.

The waste sealing rollers 50, 60 are arranged to extend between the side panel parts 23, 23 of the frame member 20 substantially in parallel and at a predetermined interval from the film feed rollers 30, 40 in the pull-out direction of the films 31, 41, i.e. in this embodiment, substantially in parallel while being spaced apart downward from the film feed rollers 30, 40. The waste sealing rollers 50, 60 are arranged to face in parallel so that the peripheral surfaces thereof are in contact with each other via the films 31, 41 passing therebetween. The waste sealing rollers 50, 60 pull out the films 31, 41 from the film feed rollers 30, 40 and bring the films 31, 41 into close contact with each other by sandwiching the films 31, 41 therebetween and rotating inwardly, i.e. one waste sealing roller 50 rotating counterclockwise and the other waste sealing roller 60 rotating clockwise in the side view of FIG. 2.

The waste sealing rollers 50, 60 may have to fulfill such a function. However, since the waste sealing rollers 50, 60 are so arranged that the peripheral surfaces thereof are proximate to each other in a normal state as described above, the thickness of the waste item passing therebetween needs to be absorbed. Accordingly, at least one of the waste sealing rollers 50, 60 needs to be such that the peripheral surface shape thereof is elastically deformed as the waste item passes.

In this embodiment, the waste sealing rollers 50, 60 are both formed by mounting cylindrical members 52, 62 made of sponge on rotary shafts 51, 61. Note that the material of the cylindrical members 52, 62 is not limited to sponge, but may be rubber, or central parts thereof having a predetermined width may be made of sponge and the both sides thereof may be made of rubber. In the case of entirely making the cylindrical members of sponge, a pull-in force for the films 31, 41 is reduced, wherefore it is preferable to partially use rubber. However, the present invention is characterized by providing the friction rollers 80, 90 described later, and the pull-in force of the waste sealing rollers 50, 60 themselves may be smaller than before since a pull-in force of these friction rollers 80, 90 acts. That is, cost can be reduced by entirely making the cylindrical members 52, 62 of the waste sealing rollers 50, 60 of sponge. In the case of entirely making the cylindrical members 52, 62 of sponge, there is almost no pull-in force for the films, but the films are pulled in by the action of the friction rollers 80, 90. This point is, of course, similar also in another embodiment described later.

Since the cylindrical members 52, 62 are elastically deformed as a waste item or the like passes, they fit to the surface shape of the waste item or the like. Accordingly, the waste item or the like can be reduced in volume by being compressed and a deaerating action of reducing the amount of air remaining between the films 31, 41 is brought about. Therefore, storage efficiency of waste items in the waste storage part 120 can be improved.

The motor 70 is arranged in a clearance between the front panel part 21 and the waste sealing roller 60 in the frame member 20. A drive belt 71 is mounted between an output shaft of the motor 70, a rotation output part of a gear or the like and a rotary shaft 61 of the waste sealing roller 60, and gears 53, 63 provided at the opposite ends of the respective waste sealing rollers 50, 60 are arranged to be engaged with each other, whereby a drive force of the motor 70 rotates the one waste sealing roller 60 via the drive belt 71 and the one waste sealing roller 60 is rotated clockwise and the other waste sealing roller 50 is rotated counterclockwise in synchronization with the waste sealing roller 60 by the engagement of the gears 53, 63. Further, the arrangement position of the motor 70 is not limited and may have to be arranged in an empty space in the frame member 20. Further, depending on the arrangement position of the motor 70, the rotation output part of the motor 70 may be directly coupled to either one of the waste sealing rollers 50, 60 without via the drive belt 71.

A power supply for the motor 70 is arbitrary, but a battery arranged in a battery box 72 is used in this embodiment. Note that it is also possible to supply power for driving the motor 70 from an outlet. However, if the battery is the power supply for the motor 70, the packaging device 10 for waste storage device can be utilized also when there is no outlet around where this device is installed and it is convenient to carry this device around.

A drive switch for the motor 70 is arbitrary, but a detector 73 such as an optical sensor is provided on the side panel part 23 in this embodiment (see FIG. 2). This detector 73 detects whether or not a waste item as an item to be treated has passed between the film feed rollers 30, 40 and is located between the films 31, 41. When detecting the waste item, the detector 73 outputs a drive signal to the motor 70 to rotate the waste sealing rollers 50, 60.

Further, it is also possible to use a weight sensor for detecting the action of the weight of a waste item on the waste sealing rollers 50, 60 as the detector. If the detector such as an optical sensor is used in this way, a treatment can be automatically performed only by throwing in a waste item. Of course, a switch such as a push button may be additionally provided and the motor 70 may be driven by operating this switch.

Next, the friction rollers 80, 90 that constitute a main part of this embodiment are described. The friction rollers 80, 90 are provided substantially in parallel below the waste sealing rollers 50, 60 so as to be able to pull the films 31, 41 sealing a waste item having passed between the waste sealing rollers 50, 60 downward. The friction rollers 80, 90 are arranged to face in parallel such that the peripheral surfaces thereof are in contact with each other via the films 31, 41 passing therebetween. The friction rollers 80, 90 pull out the films 31, 41 by sandwiching the films 31, 41 therebetween and rotating inwardly, i.e. one friction roller 80 rotating counterclockwise and the other friction roller 90 rotating clockwise in the side view of FIG. 2.

More specifically, substantially cylindrical housings 81, 91 having a substantially elliptical cross section are arranged to extend substantially in parallel between the side panel parts 23, 23 of the frame member 20 while being spaced apart downward from the two waste sealing rollers 50, 60. Shaft parts 82, 92 are integrally provided to the housing 81, 91 near upper parts of the housings 81, 91 and, as shown in FIGS. 2 and 3, the opposite longitudinal ends of the shaft parts 82, 92 are supported on a total of four supporting members 26 extending along the lower edges of the respective side panel parts 23, 23 of the frame member 20 and fixed at positions near the front panel part 21 and the rear panel part 22.

The friction rollers 80, 90 are provided substantially in longitudinal central parts of the housings 81, 91 rotatably by shaft parts 84, 94, and parts of the outer peripheries of the respective friction rollers 80, 90 or at least sides where the friction rollers 80, 90 are in contact with each other are exposed to the outside through opening parts 83, 93 provided substantially in longitudinal central parts of the housings 81, 91. Further, since the shaft parts 84, 94 of the friction rollers 80, 90 are located below the shaft parts 82, 92 of the housings 81, 91, the friction rollers 80, 90 can move toward and away from each other as indicated by arrows in FIG. 2 by the rotation of the housings 81, 91 about the shaft parts 82, 92.

Springs (coil springs) 87 extend between the respective end parts of the shaft parts 84, 94 supporting the friction rollers 80, 90 and the supporting members 26. In this embodiment, as shown in FIGS. 2 and 3, the spring 87 as an elastic member obliquely extends between the shown front end part of the shaft part 94 and the shown front supporting member 26 provided near the rear panel part 22, and the spring 87 obliquely extends between the shown rear end part of the shaft part 84 and the shown rear supporting member 26 provided near the front panel part 21. In this way, the housings 81, 91 are supported rotatably about the shaft parts 82, 92. Since the friction rollers 80, 90 can move toward and away from each other by the rotation of the housings 81, 91, waste items having a predetermined thickness can pass in the case of using the friction rollers 80, 90 made of a hard material.

Figure 4:
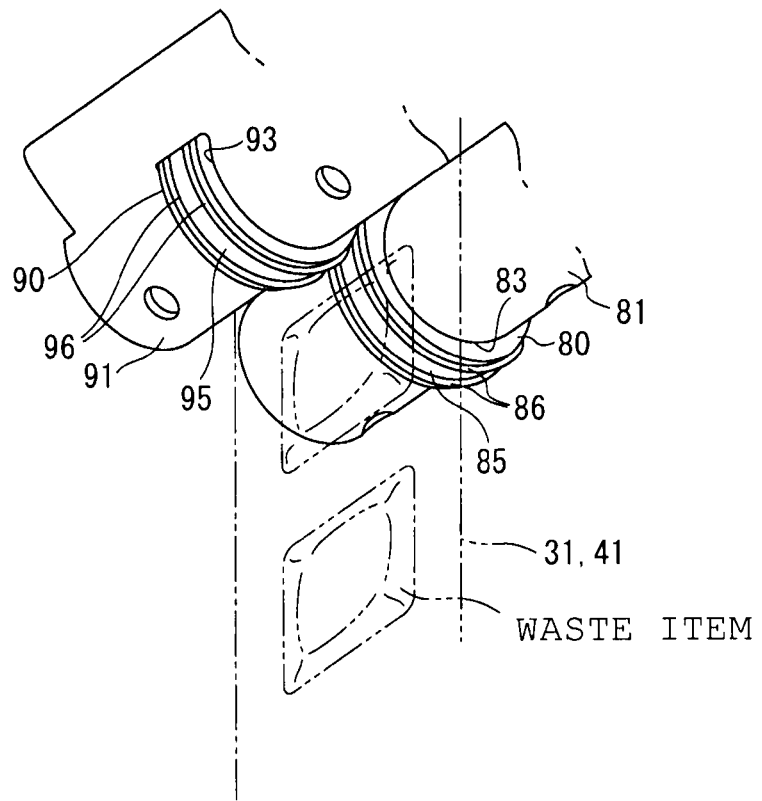
FIG. 4 is a perspective view showing another mode of friction rollers.

The friction rollers 80, 90 are preferably, for example, hard resin rollers whose peripheral surfaces 85, 95 have a high friction coefficient to increase a downward pull-in force for the films 31, 41. The pull-in force increases as frictional forces of the friction rollers 80, 90 increase. To this end, the peripheral surfaces 85, 95 may be made of a material having a high friction coefficient or separate members having a high friction coefficient may be mounted on the peripheral surfaces 85, 95. For example, as show in FIG. 4, O-rings 86, 96 made of hard rubber may be so provided in circumferential directions of the peripheral surfaces 85, 95 of the friction rollers 80, 90 as to be held in contact with each other at corresponding positions. That is, by sandwiching the films 31, 41 by a concentrated force between the O-rings 86, 96 of the friction rollers 80, 90, the pull-in force can be further increased. Note that the number of the O-rings 86, 96 is not limited to two as shown or other frictional members may also be used.

By increasing the pull-in force of the friction rollers 80, 90, the waste item sealed between the films 31, 41 is so stored into the waste storage part 120 as to be pressed against the waste items already stored in the waste storage part 120 with a stronger force than before upon exiting from between the friction rollers 80, 90. Accordingly, the storage efficiency of waste items can be further improved.

Figure 5:
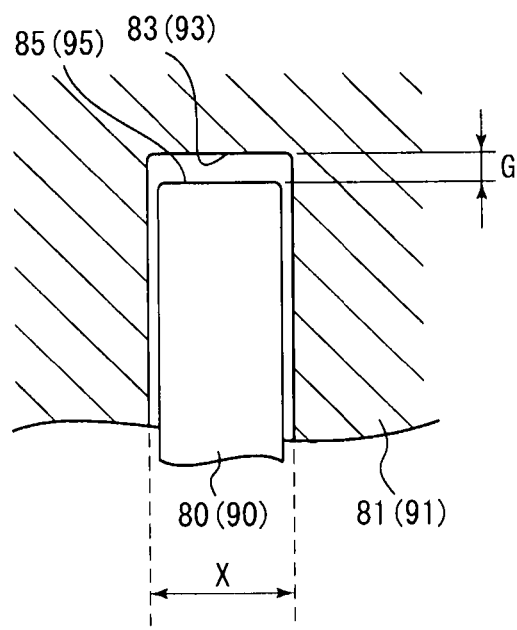
FIG. 5 is a sectional view of an essential part showing a clearance between an opening part of a housing and the peripheral surface of the friction roller.

As shown in FIG. 5, width X of the opening parts 83, 93 of the housings 81, 91 and the width of the friction rollers 80, 90, parts of which are exposed to the outside through the opening parts 83, 93 and held in contact with at least the films 31, 41, are preferably narrower than the width of the films 31, 41. Further, as shown in FIG. 5, clearances G between the peripheral surfaces 85, 95 of the respective friction rollers 80, 90 and the housings 81, 91 are preferably less than the thickness of the waste item. This increases an effect of preventing the waste item fed by the friction rollers 80, 90 from being caught in the friction rollers 80, 90. The length of the clearances G is preferably set to 5 mm or less in the case of disposable diapers and sanitary napkins.

A rotation driving mechanism for the friction rollers 80, 90 is described. As shown in FIGS. 1 to 3, there are provided second gears 112, 112 engaged with the gears 53, 63 (hereinafter, referred to as "first gears 53, 63" for the sake of convenience) provided at one longitudinal ends of the waste sealing rollers 50, 60 and third gears 113, 113 arranged on the same shaft parts 82, 92 as the second gears 112, 112. Further, fourth gears 114, 114 engaged with the third gears 113, 113 are provided on the shaft parts 84, 94 of the friction rollers 80, 90. When rotation is transmitted to the fourth gears 114, 114, the friction rollers 80, 90 are rotated in synchronism with the fourth gears 114, 114.

Note that a gear ratio of the first gears 53, 63 and the second gears 112, 112 is 2:1 and that of the second gears 112, 112, the third gears 113, 113 and the fourth gears 114, 114 is 1:1:1. However, the gear ratios of the respective gears 111 to 114 are not limited to these and, basically, the rotation speed of the friction rollers 80, 90 is preferably equal to or faster than that of the waste sealing rollers 50, 60.

Although the friction rollers 80, 90 described above are rotated utilizing the rotation drive of the waste sealing rollers 50, 60, it is also possible to provide a drive source such as a motor different from the one for the waste sealing rollers 50, 60 and a rotation transmission mechanism such as gears and a drive belt.

Next, functions of this embodiment are described. The frame member 20 of the packaging device 10 for waste storage device is mounted in the upper part of the waste storage part 120 as shown in FIG. 6 and this entire assembly is used as a waste storage device 100. As initial setting, the respective films 31, 41 on the film feed rollers 30, 40 are sandwiched between the waste sealing rollers 50, 60 and between the friction rollers 80, 90.

When a waste item is thrown in through the inlet 24 of the packaging device 10 for waste storage device, the detector 73 such as an optical sensor detects the waste item and outputs a drive signal to the motor 70. Upon receiving the drive signal, the motor 70 starts rotating. Then, the rotation of the motor 70 is transmitted from the drive belt 71 to the waste sealing rollers 50, 60, which start rotating in synchronization.

First, the respective films 31, 41 are bonded by being brought into close contact with each other by the two waste sealing rollers 50, 60. The films 31, 41 are bonded with each other by passing between the waste sealing rollers 50, 60. During this time, the thrown-in waste item passes between the waste sealing rollers 50, 60. At the time of passage, the cylindrical members 52, 62 of the waste sealing rollers 50, 60 are elastically deformed along the shape of the waste item and press the waste item while absorbing the thickness thereof, wherefore the films 31, 41 are brought into close contact with the periphery (surface) of the waste item while deaeration is carried out. When the waste item is fed below the waste sealing rollers 50, 60 after the waste sealing rollers 50, 60 make one turn or a predetermined number of turns, the films 31, 41 are directly bonded again using the adhesive layers by the waste sealing rollers 50, 60.

As a result, the waste item is sealed with the films 31, 41 and stored into the waste storage part 120 in this state. Even when waste items are thrown in again, the above action is repeated and the waste items are successively sealed. Accordingly, there is little smell leakage to the outside. In this case, even if the films 31, 41 are brought into close contact only at the lateral edges other than at the leading end parts of the films 31, 41, there is little smell leakage to the outside since the waste sealing rollers 50, 60 are in contact with each other in the normal state. However, it is preferable to bring the films 31, 41 into close contact also at positions before and behind the waste item as described above. Note that the motor 70 is set to stop upon the elapse of a predetermined time, for example, after no more waste items are detected by the detector 73.

Since the films 31, 41 having sealed the waste item at the two waste sealing rollers 50, 60 are pulled downward by the two friction rollers 80, 90 driven and rotated below the rollers 50, 60, it can be prevented that the waste item is caught in the waste sealing rollers 50, 60 as before. When the waste item passes between the friction rollers 80, 90, the housings 81, 91 rotate about the shaft parts 82, 92 in outward directions away from each other. This enables the passage of the waste item having a predetermined thickness.

Since members having a high friction coefficient are used as the two friction rollers 80, 90, the pull-in force is increased by the friction rollers 80, 90 and a new waste item sealed with the films 31, 41 is so stored as to be pressed against the waste items already stored in the waste storage part 120, wherefore the storage efficiency of waste items can be increased.

Further, since the width of the opening parts 83, 93 of the housings 81, 91 is narrower than the film width, an effect of preventing waste items from being caught in the friction rollers 80, 90 is increased. Since the clearances G between the peripheral surfaces 85, 95 of the respective friction rollers 80, 90 and the housings 81, 91 is less than the thickness of waste items, the effect of preventing waste items from being caught in the friction rollers 80, 90 is further increased.

As described above, according to this embodiment, the films 31, 41 sealing the waste item are caught in neither the waste sealing rollers 50, 60 nor the friction rollers 80, 90. Thus, more waste items can be pushed into the waste storage part 120 to increase the storage efficiency of waste items.

Waste items can be treated until the respective films 31, 41 are used up, but it is also possible to cut the films 31, 41 halfway and discard them according to a storage volume of the waste storage part 120.

FIGS. 7 to 11 are diagrams showing an essential part of a packaging device 10A for waste storage device according to another embodiment of the present invention. This embodiment differs from the above embodiment in a mechanism composed of friction rollers 800, 900, housings 810, 910 and the like and adapted to pull a waste item downward.

Figure 7:
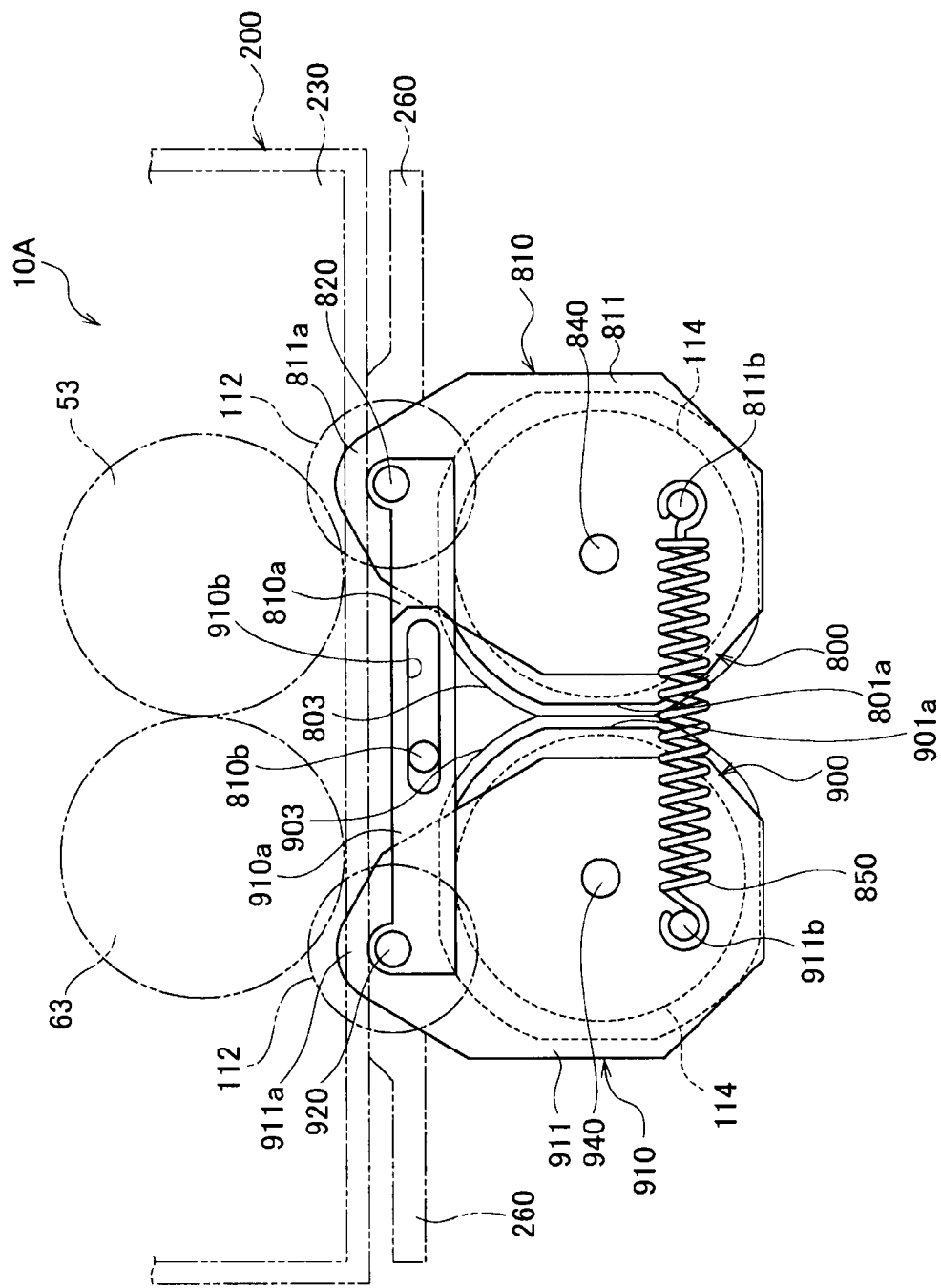
FIG. 7 is a front view showing an essential part of a packaging device for waste storage device according to another embodiment of the present invention.
Figure 8:
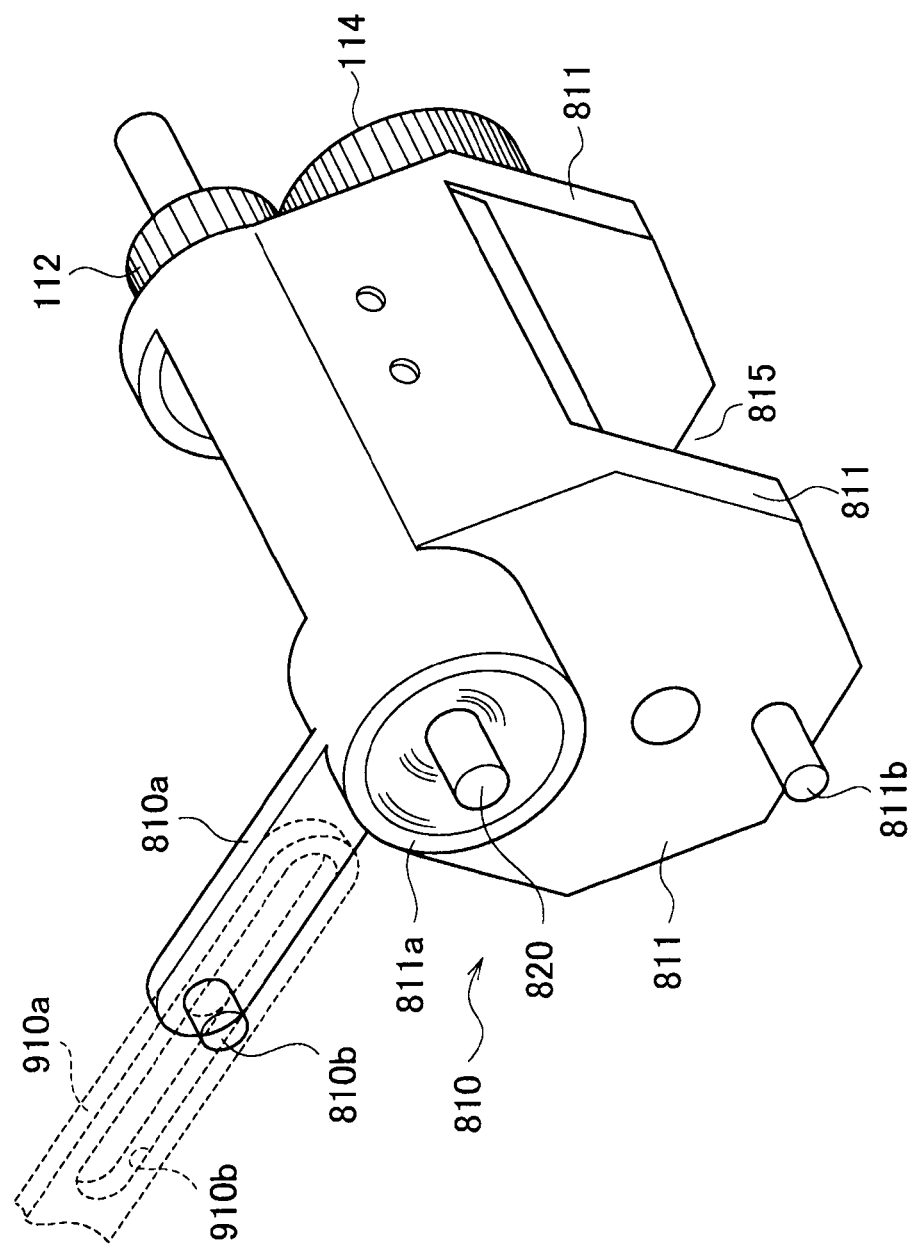
FIG. 8 is a perspective view showing the construction of a housing of the packaging device for waste storage device according to the other embodiment.

First, as shown in FIGS. 7 and 8, each of the housings 810, 910 includes two end wall parts 811, 811 or 911, 911 facing each other at a predetermined interval from each other, and shaft parts 820, 920 provided at upper parts 811a, 911a are supported in shaft holes formed in supporting members 260 provided along the lower edges of side panel parts 230, 230 of a frame member 200 similar to the above embodiment.

Figure 9:
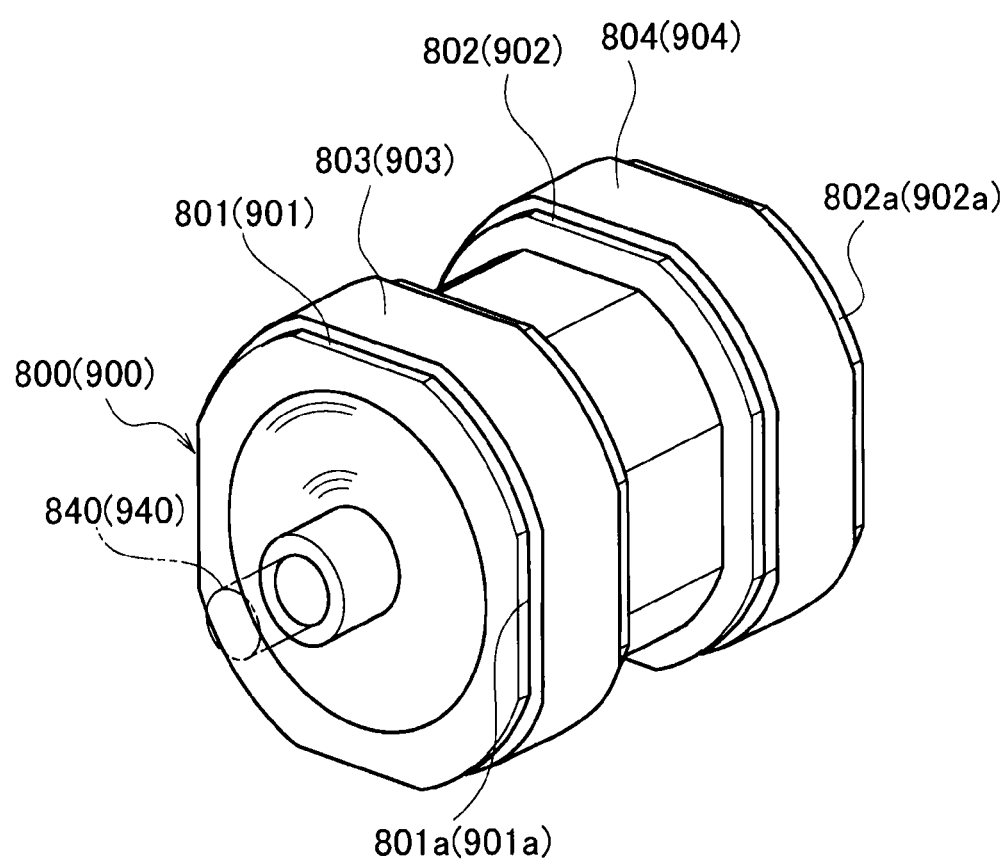
FIG. 9 is a perspective view showing a friction roller of the packaging device for waste storage device according to the other embodiment.
Figure 10:
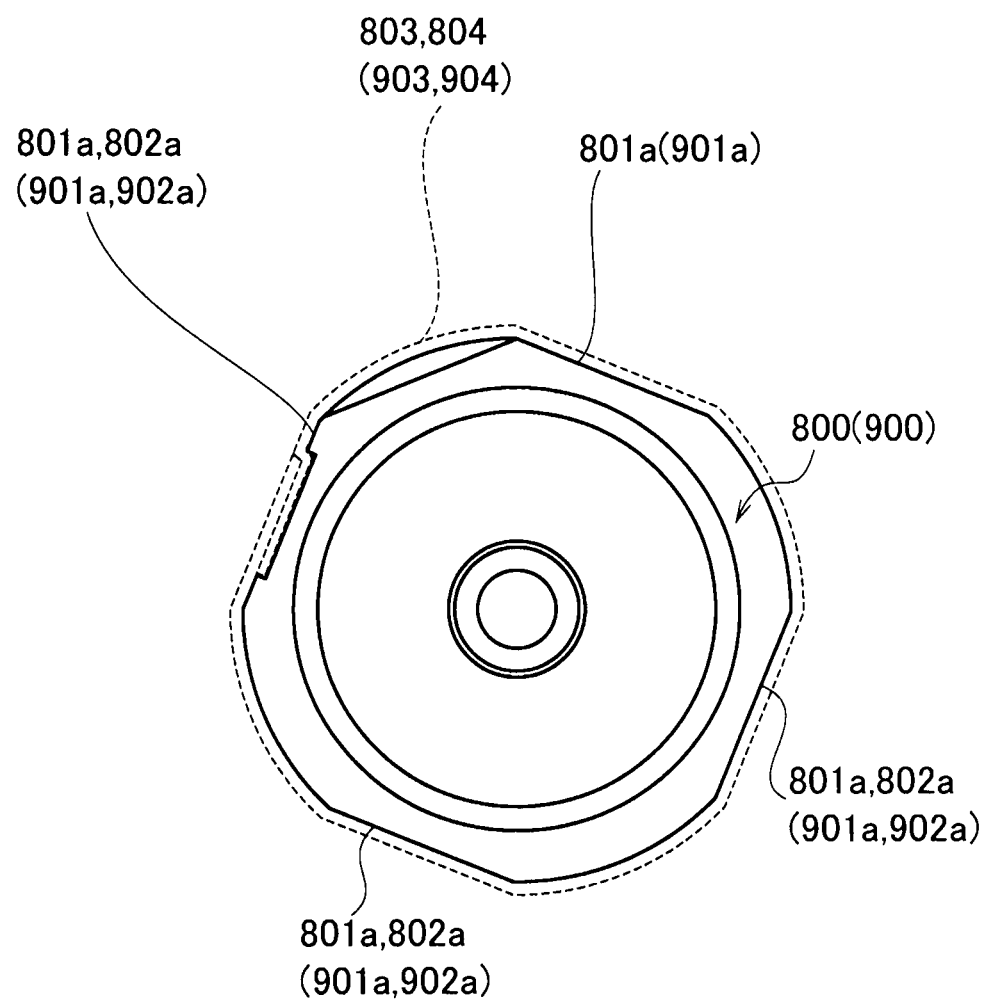
FIG. 10 is a front view showing the friction roller of the packaging device for waste storage device according to the other embodiment.

As shown in FIGS. 7, 9 and 10, the friction rollers 800, 900 are arranged in spaces 815 between the facing end wall parts 811, 811 of the housing 810 and between the facing end wall parts 911, 911 of the housing 910 and supported on the respective end wall parts 811, 911 via shaft parts 840, 940, thereby being able to rotate. In this embodiment, each of the friction rollers 800, 900 includes two roller parts 801, 802 or 901, 902 along an axial direction. Further, the respective roller parts 801, 802, 901 and 902 do not have cylindrical peripheral surfaces, but have flat surfaces 801a, 802a, 901a and 902a on at least parts of the peripheral surfaces. Note that the flat surfaces 801a, 802a of one friction roller 800 and the flat surfaces 901a, 902a of the other friction roller 900 are so position-adjusted as to be facing each other when the respective friction rollers 800, 900 rotate (see FIG. 7). In this embodiment, flat surfaces 801a, 802a, 901a and 902a are formed at four positions at equal intervals in a circumferential direction, and surface parts between adjacent flat surfaces are curved surfaces (see FIG. 10).

Friction members for increasing frictional forces, e.g. rubbers 803, 804, 903 and 904 such as urethane rubbers are mounted in the circumferential direction on the peripheral surfaces of the respective roller parts 801, 802, 901 and 902 of the friction rollers 800, 900. The friction rollers 800, 900 are preferably such that the outer peripheral length of the respective roller parts 801, 802, 901 and 902 mounted with the rubbers 803, 804, 903 and 904 is longer than that of waste sealing rollers 50, 60. This causes a predetermined tension to be constantly applied to films 31, 41 between the waste sealing rollers 50, 60 and the friction rollers 800, 900 (in this embodiment, friction rollers mounted with the rubbers 803, 804, 903 and 904), wherefore entanglement of the films 31, 41 in the waste sealing rollers 50, 60 is further reduced.

Note that, in this embodiment, second gears 112, 112 are engaged with first gears 53, 63 provided at one longitudinal ends of the waste sealing rollers 50, 60 and engaged with fourth gears 114, 114 provided on the shaft parts 840, 940 of the friction rollers 800, 900, whereby rotation is transmitted. Further, in this embodiment, the first gears 53, 63 and the fourth gears 114, 114 are set to have an equal diameter. This makes the housings 800, 900 easily open relative to each other in a lateral direction.

Figure 11:
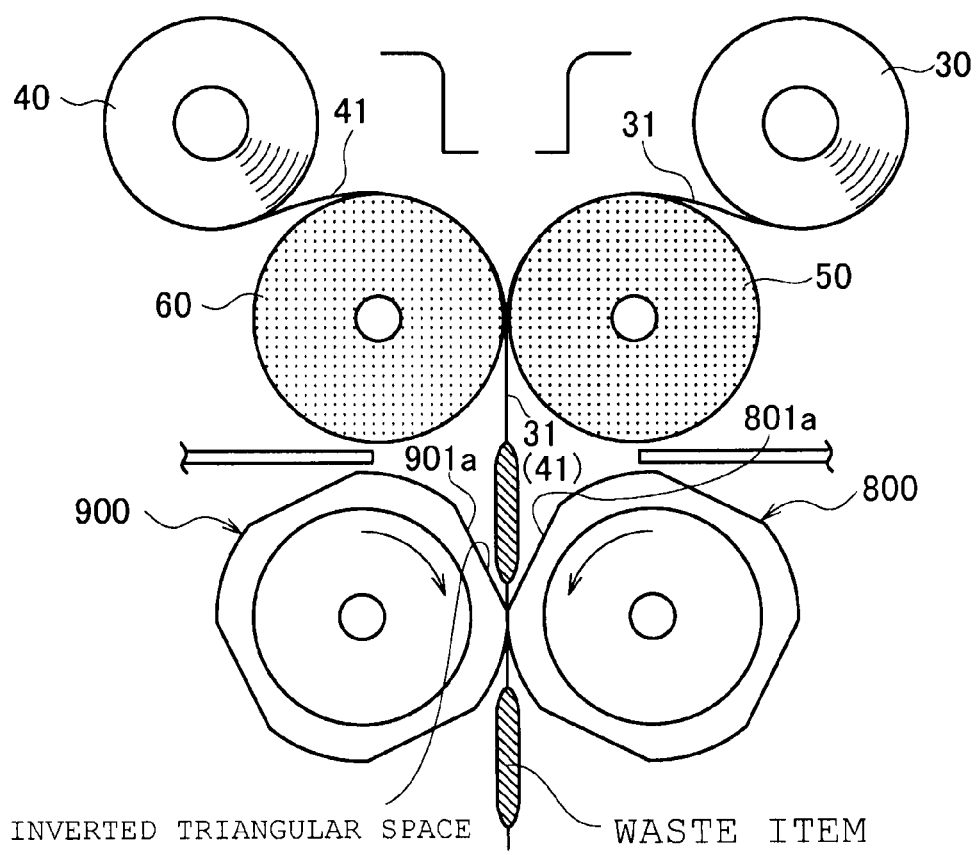
FIG. 11 is a diagram showing a function of the packaging device for waste storage device according to the other embodiment.

Basic functions of this embodiment are just as in the above embodiment. As shown in FIG. 11, upon passing between the waste sealing rollers 50, 60, the films 31, 41 are brought into close contact to seal the waste item and the films 31, 41 are pulled downward by the friction rollers 800, 900. At this time, firstly because the outer peripheral length of the friction rollers 800, 900 (equivalent to the outer peripheral length of the rubbers 803, 804, 903 and 904 in this embodiment) is longer than that of the waste sealing rollers 50, 60, a predetermined tension constantly acts between them. When the waste item is about to enter between the pair of friction rollers 800, 900 (in this embodiment, between one rubbers 803, 804 and the other rubbers 903, 904), an inverted triangular (wedge-shaped) space is formed between the one flat surfaces 801a, 802a and the other flat surfaces 901a, 902a facing them and the waste item enters this space, wherefore the waste item can be reliably sandwiched and pulled downward. Accordingly, a downward pull-in force for the films 31, 41 by the friction rollers 800, 900 is stronger than in the above embodiment. Thus, storage efficiency of waste items stored into the waste storage part 120 mounted with the packaging device 10A for waste storage device of this embodiment can be more increased than in the above embodiment.

When the waste item passes between the pair of friction rollers 800, 900 (in this embodiment, between the one rubbers 803, 804 and the other rubbers 903, 904), the housings 810, 910 are rotated in (outward) directions away from each other about the shaft parts 820, 920 according to the thickness of the waste item. Thus, the waste item can pass between the pair of friction rollers 800, 900.

Here, a rotation control member for controlling the rotation of the one housing 810 (and the one friction roller 800) and the other housing 910 (and the other friction roller 900) is provided in this embodiment. This rotation control member is, as shown in FIG. 7, composed of one arm 810a which rotates integrally with the one housing 810 and another arm 910a which rotates integrally with the other housing 910. As shown in FIGS. 7 and 8, a pin 810b is provided near the tip of the one arm 810a, a long hole 910b extending along a longitudinal direction is perforated in a part of the other arm 910a closer to the tip than a central part, and the pin 810b is inserted into the long hole 910b and movable along the long hole 910b. Further, the width of the long hole 910b is set to be substantially equal to the diameter of the pin 810b. Note that engaging projections 811b, 911b are provided near the lower ends of the end wall parts 811 of the one housing 810 and near the lower ends of the end wall parts 911 of the other housing 910, both ends of coil springs 850 are engaged with the engaging projections 811b, 911b to constantly bias the one housing 810 and the other housing 910 in directions toward each other.

According to this embodiment, when the housings 810, 910 are rotated outwardly by the passage of a waste item between the pair of friction rollers 800, 900, the pin 810b of the one arm 810a presses down the inner wall of the long hole 910b of the other arm 910a. Thus, the one housing 810 (and the one friction roller 800) and the other housing 910 (and the other friction roller 900) are respectively rotated outwardly and equally against elastic forces of the coil springs 850 with a central point therebetween as a reference point. In the absence of the rotation control member, a bias such as rotation of the one housing 810 (and the one friction roller 800) and the other housing 910 (and the other friction roller 900) in the same direction occurs and the inverted triangular space between the facing flat surfaces 801a, 901a of the friction rollers 800, 900 and the inverted triangular space between the facing flat surfaces 802a, 902a lose shape, whereby the downward pull-in force for the films 31, 41 is reduced. Thus, as described above, the one housing 810 (and the one friction roller 800) and the other housing 910 (and the other friction roller 900) are preferably equally rotated.

REFERENCE SIGNS LIST 10, 10A packaging device
20 frame member
21 front panel part
22 rear panel part
23 side panel part
24 inlet
25 lower end opening part
26 supporting member
30, 40 film feed roller
31, 41 film
50, 60 waste sealing roller
51, 61 rotary shaft
52, 62 cylindrical member
53, 63 gear (first gear)
70 motor (driving part)
71 drive belt
80, 90, 800, 900 friction roller
81, 91, 810, 910 housing
82, 92, 820, 920 shaft part
83, 93 opening part
84, 94 shaft part
85, 95 peripheral surface
86, 96 O-ring
87 spring
100 waste storage device
112 second gear
113 third gear
114 fourth gear
120 waste storage part

The invention claimed is:

1. A packaging device for waste storage device arranged in an upper part of a waste storage part for storing a waste item and adapted to seal the waste item and store it in the waste storage part, comprising:
    a frame member which is formed with an inlet for allowing the waste item to be thrown in;
    two film feed rollers which are provided in the frame member to be parallel to each other and to be a predetermined distance apart from each other;
    two waste sealing rollers which are provided in the frame member and arranged such that peripheral surfaces thereof are in contact via films pulled out from the respective film feed rollers and at least one of which has a peripheral surface that is elastically deformed along the shape of the waste item;
    a driving part which rotates the respective waste sealing rollers; and
    two friction rollers which are driven and rotated to pull the waste item having passed between the two waste sealing rollers downward in a state where the waste item is sealed between two films, and located below the two waste sealing rollers,
    wherein the two friction rollers are rotatably provided in housings arranged below the two waste sealing rollers and at least parts of the respective friction rollers in contact with the films are exposed to the outside through opening parts formed in the respective housings.

2. The packaging device for waste storage device according to claim 1, wherein a width of the respective opening parts of the respective housings is narrower than that of the films, and clearances between the peripheral surfaces of the respective friction rollers and the opening parts of the respective housings are less than the thickness of the waste item.

3. The packaging device for waste storage device according to claim 2, wherein the clearances between the peripheral surfaces of the respective friction rollers and the opening parts of the respective housings are equal to or less than 5 mm.

4. The packaging device for waste storage device according to claim 1, wherein the respective housings supporting the respective friction rollers are biased in directions toward each other by an elastic member in a normal state and are rotated outwardly together with the friction rollers when a load acts in a direction to separate the friction rollers.

5. The packaging device for waste storage device according to claim 4, wherein the respective housings include a rotation control member for controlling rotation when a load acts in the direction to separate the friction rollers.

6. The packaging device for waste storage device according to claim 5, wherein:
    the respective housings are provided rotatably about upper parts thereof;
    the rotation control member includes one arm provided on one housing and another arm provided on the other housing and a pin formed on the one arm is engaged with a long hole formed in the other arm; and
    the respective arms are rotated together with the respective housings, whereby the pin of the one arm presses the inner wall of the long hole of the other arm and the respective housings are respectively rotated equally outwardly with a central point therebetween as a reference point.

7. The packaging device for waste storage device according to claim 1, wherein the respective friction rollers are so shaped as to have flat surfaces on at least parts of the outer peripheral surfaces thereof and so provided that the flat surface of one friction roller and the flat surface of the other friction roller are facing each other at the time of rotation.

8. The packaging device for waste storage device according to claim 1, wherein the outer peripheral length of the friction rollers is longer than that of the waste sealing rollers.

9. The packaging device for waste storage device according to claim 1, wherein friction members are provided on the peripheral surfaces of the respective friction rollers.

10. The packaging device for waste storage device according to claim 1, wherein the rotation speed of the two friction rollers is equal to or faster than that of the two waste sealing rollers.

11. A waste storage device, characterized in that the packaging device for waste storage device according to claim 1 is arranged in an upper part of a waste storage part for storing a waste item.

\* \* \* \* \*

UNITED STATES PATENT AND TRADEMARK OFFICE
CERTIFICATE OF CORRECTION

| | | Page 1 of 1 |
|---|---|---|
| PATENT NO. | : 9,079,710 B2 | |
| APPLICATION NO. | : 13/380062 | |
| DATED | : July 14, 2015 | |
| INVENTOR(S) | : Nakano | |

It is certified that error appears in the above-identified patent and that said Letters Patent is hereby corrected as shown below:

On the title page, Item (73) should read:

--(73) Assignee: Kyoritsu Seiyaku Corporation, Tokyo (JP)--

Signed and Sealed this
First Day of December, 2015

Michelle K. Lee
*Director of the United States Patent and Trademark Office*